US006256966B1

(12) United States Patent
Braun et al.

(10) Patent No.: US 6,256,966 B1
(45) Date of Patent: Jul. 10, 2001

(54) PROCESS FOR MANUFACTURING POUCHES OF ETHYLENE COPOLYMER FILM FOR CONTAINING A FLOWABLE MATERIAL

(75) Inventors: Vladimir Ronald Braun, Toronto; Alana Joi Robson, nee Verdone, Ernestown Township, both of (CA)

(73) Assignee: DuPont Canada Incorporated, Mississauga (CA)

( * ) Notice: Subject to any disclaimer, the term of this patent is extended or adjusted under 35 U.S.C. 154(b) by 0 days.

(21) Appl. No.: 09/037,528

(22) Filed: Mar. 10, 1998

Related U.S. Application Data

(62) Continuation of application No. 08/732,533, filed on Oct. 15, 1996, which is a continuation of application No. 08/448,346, filed as application No. PCT/CA94/00571 on Oct. 13, 1994.

(30) Foreign Application Priority Data

Oct. 14, 1996 (GB) .................................................. 9321254

(51) Int. Cl.⁷ ........................... B29D 23/00; B29D 31/00; B32B 27/06; B32B 27/18; B32B 27/32

(52) U.S. Cl. .............................. 53/451; 53/479; 428/35.2; 428/35.5; 428/35.7; 525/240

(58) Field of Search .................................. 428/35.2, 35.5, 428/35.7; 525/240; 53/451, 479

(56) References Cited

U.S. PATENT DOCUMENTS

| 4,521,437 | * | 6/1985 | Storms | 426/130 |
|---|---|---|---|---|
| 5,360,648 | * | 11/1994 | Falla et al. | 428/35.2 |
| 5,523,136 | * | 6/1996 | Fischer et al. | 428/35.2 |

FOREIGN PATENT DOCUMENTS

WO 93/03093 * 2/1993 (WO) .............................. C08L/23/04

* cited by examiner

Primary Examiner—Rena L. Dye
Assistant Examiner—Sandra M. Nolan

(57) ABSTRACT

A pouch containing a flowable material and films and processes for making the pouch are disclosed. The pouch is made from a sealant film having at least two heat-sealed edges and made from a material comprising a copolymer of ethylene and at least one $C_4$–$C_{10}$ alpha-olefin manufactured in a polymerization process using a single-site polymerization catalyst.

12 Claims, No Drawings

PROCESS FOR MANUFACTURING POUCHES OF ETHYLENE COPOLYMER FILM FOR CONTAINING A FLOWABLE MATERIAL

This application is a division of Ser. No. 08/732,533, filed Oct. 15, 1996 pending which was a continuation of Parent application Ser. No. 08/488,346 filed Oct. 13, 1994, now abandoned which is a 371 of PCT/CA94/00571 filed Oct. 13, 1994.

The invention relates to films used to make pouches filled with flowable materials, e.g. liquids.

As used herein, the term "flowable material" does not include gaseous materials, but encompasses materials which are flowable under gravity or may be pumped. Such materials include liquids e.g. milk, water, fruit juice, oil; emulsions e.g. ice cream mix, soft margarine; pastes e.g. meat pastes, peanut butter; preserves e.g. jams, pie fillings marmalade; jellies; doughs; ground meat e.g. sausage meat; powders e.g. gelatin powders, detergents; granular solids e.g. nuts, sugar; and like materials. The invention described herein is particularly useful for flowable foods e.g. milk.

It is well known to package flowable materials, for example, milk on a pouch-forming apparatus such as a so-called vertical form, fill and seal apparatus. Typically, using such an apparatus, a flat web of synthetic thermoplastic film is unwound from a roll and formed into a continuous tube in a tube-forming section, by sealing the longitudinal edges on the film together to form a so-called lap seal or a so-called fin seal. The tube thus formed is pulled vertically downwards to a filling station. The tube is then collapsed across a transverse cross-section of the tube, the position of such cross-section being at a sealing device below the filling station. A transverse heat seal is made, by the sealing device, at the collapsed portion of the tube, thus making an air-tight seal across the tube. The material being packaged enters the tube above the transverse heat seal in a continuous or intermittent manner, thereby filling the tube upwardly from the transverse heat seal. The tube is then allowed to drop a predetermined distance usually under the influence of the weight of the material in the tube. The jaws of the sealing device are closed again, thus collapsing the tube at a second transverse section, which may be at, above or below the air/material interface in the tube, depending on the nature of the material being packaged and the mode of operation of the process. The sealing device seals and severs the tube transversely at the second transverse section. The material-filled portion of the tube is now in the form of a pillow shaped pouch. Thus, the sealing device has sealed the top of the filled pouch, sealed the bottom of the next-to-formed pouch and separated the filled pouch from the next-to-be formed pouch, all in one operation. Variations on pouch-forming machines and in particular on this type of vertical form fill and seal apparatus are either known or conceivable. For example, the forming and sealing functions may be performed separately from severing function on separate machines. Also, the jaws of the sealing device could move to the next sealing position rather than have the film drop to the next position or there could be two sets of sealing jaws that seal both transverse ends simultaneously. Further, instead of forming a tube, two pieces of film-could be fed into the maching and the pouch could be made by four seals, two longitudinal and two transverse.

Examples of the vertical form, fill and seal apparatus of the type described above are the Prepac® IS-6 or IS-7 liquid packaging machines.

A sealing device commonly used is a so-called impulse sealer which has a sealing element mounted in sealing jaws and electrically insulated therefrom. In operation, the sealing jaws are closed and an electrical current is caused to flow through a sealing element e.g. a wire, for a fraction of the time that the jaws are closed. The jaws remain closed during a cooling or equilibration period, during which the seal forms, before the sealing jaws are opened. The synthetic thermoplastic film must be able to provide a transverse seal that supports the weight of the flowable material e.g. liquid, in the next-to-be-formed pouch. It is important that the cooling of the seal takes effect before the weight of the liquid can weaken or rupture the bottom seal. Sealing may also be carried out using any other suitable heat-sealing apparatus.

In the operation of pouch-forming machines, it is known to use film made from a blend containing 70–90% linear ethylene/butene-1 copolymer having a density of about 0.919 g/cm$^3$ and a melt index of about 0.75 dg/min and 10–30% high pressure polyethylene i.e. a homopolymer, having a melt index of about 2 to 10 dg/min and a density of from 0.916 to 0.924 g/cm$^3$. Density is determined by ASTM Procedure D1505-85 and melt index by ASTM Procedure D1238-90B Condition E). Such films having a thickness of about 76 micrometers, have been used commercially on vertical form fill and seal apparatuses for making pouches containing about 1.3 liters of milk. Pouches made from such film tend to suffer from defective seals i.e. a tendency to have weak transverse end/and longitudinal seals even though the operating conditions of the impulse sealer have been optimized. Defective seals may lead to the phenomenon known as "leakers", in which the flowable material e.g. milk, may escape from the pouch through pinholes that develop at or close to the seal. It has been estimated that leakers account for about 1–2% of the 1.3 liter milk pouch production.

U.S. Pat. No. 4,521,437 of W. J. Storms, issued Jun. 4, 1985, discloses the use of pouches of ethylene/octene-1 copolymer film in the packaging of flowable materials. That patent discloses that pouches made from the ethylene/octene-1 copolymer provide superior leaker performance i.e. a lower percentage of leakers, compared with related films described above that are formed from linear ethylene/butene-1 copolymers.

It has now been surprisingly found that further improvements in leaker performance may be achieved using ethylene copolymers manufactured using a single-site polymerization catalyst.

Accordingly, the present invention provides a film for making pouches containing a flowable material, said pouch having at least two heat sealed ends, said film being made from a composition comprising a copolymer of ethylene and at least one $C_4$–$C_{10}$ alpha-olefin manufactured in a polymerization process using a single-site polymerization catalyst.

The present invention further provides a pouch containing a flowable material, said pouch having at least two heat-sealed edges, wherein the film is made from a composition comprising a copolymer of ethylene and at least one $C_4$–$C_{10}$ alpha-olefin manufactured in a polymerization process using a single-site polymerization catalyst.

The present invention still further provides a process for making pouches filled with a flowable material, using a vertical form, fill and seal apparatus, in which process each pouch is made from a flat web of film by forming a tubular film therefrom with a longitudinal seal and subsequently flattening the tubular film at a first position and transversely heat sealing said tubular film at the flattened position, filling the tubular film with a predetermined quantity of flowable material above said first position, flattening the tubular film above the predetermined quantity of flowable material at a second position and transversely heat sealing said tubular film at the second position, the improvement comprising making the pouches from a flat web of film made from a composition comprising a copolymer of ethylene and at least one $C_4$–$C_{10}$ alpha-olefin manufactured in a polymerization process using a single-site catalyst.

The film of the present invention preferably has a density in the range of 0.86 to 0.94 g/cm$^3$ and a melt index of 0.2 to 10 dg/min and most preferably has a density in the range of 0.88 to 0.93 g/cm$^3$ and a melt index of 0.3 to 5 dg/min.

The ethylene copolymer made with single-site catalyst may be obtained using a variety of known polymerization processes for the manufacture of linear polyethylene including processes that operate in solution, in the gas phase or as a slurry process. Ethylene copolymers made with the single site catalysts are commercially available and may be manufactured in accordance with processes disclosed in Modern Plastics, p.15, May 1993, Plastics Focus Vol. 25, No. 12, Jun. 21, 1993 and in Exxon Chemical Exact Facts, Vol.1, No. 1, February 1993. By the term "single-site catalyst" is meant a metallocene or constrained geometry catalyst. Metallocene catalysts are organometalic co-ordination compounds obtained as a cyclopentadienyl (Cp) derivative of a transition metal or metal halide. The metal is bonded to the Cp ring by electrons moving in orbitals extending above and below the plane of the ring (pi bond). Metallocene catalysts systems are extremely sensitive to the geometry of the catalytic site at the transition metal (the "single-site"). Examples of single-site catalysts include $Cp_2TICl_2$, $Cp_2ZrCl2$, $Cp_2HfCl_2$, $(C_5(CH_3)_5)_2TiCl_2$, $Ph_2Me(Ind)_2ZrCl_2$, $[Me_4CpSi(Me)_2N(t—Bu)]TiCH_2[o—PhN(Me_2)]$, $Cp_2Fe$ $B(C_6F_5)_4$.

The polyethylene obtained with the single site catalyst preferably has a density in the range of 0.8 to 0.93 g/cm$^3$, and especially in the range of 0.88 to 0.91 g/cm$^3$. In addition the polymer preferably has a melt index of less than 5 dg/min, particularly in the range of 0.3 to 2 dg/min and especially in the range of 0.5 to 1.5 dg/min. Preferred polymers include ethylene/butene-1, ethylene/hexene-1, ethylene/octene-1 and ethylene/hexene-1/butene-1 copolymers.

The composition used to make the pouches preferably further comprises at least one polymer selected from the group comprising a linear copolymer of ethylene and at least one $C_4$–$C_{10}$ alpha-olefin, a high pressure polyethylene and blends thereof. Preferably the composition comprises 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group comprising a linear copolymer of ethylene and at least one $C_4$–$C_{10}$ alpha-olefin, a high pressure polyethylene and blends thereof. In particularly preferred embodiments, the composition comprises 20–100 and especially 50–100 parts of the copolymer obtained using the single site catalyst, and conversely 0–80 and 0–50 parts of the other polymers specified above.

Processes for the manufacture of so-called high pressure polyethylene from ethylene monomer have been operated commercially for decades. A variety of such polymers are available. The high pressure polyethylene preferably has a density of 0.916 to 0.93 g/cm$^3$, especially 0.918 to 0.925 g/cm$^3$. In addition, the high pressure polyethylene preferably has a melt index in the range of 1 to 10 dg/min. and especially in the range of 1.5 to 5 dg/min.

Processes for the commercial manufacture of linear copolymers of ethylene and at least one $C_4$–$C_{10}$ alpha-olefin have been Known for more than thirty years. Such processes may be operated in solution, in the gas phase or as a slurry process. The catalysts used are frequently based on titanium and are referred to as coordination catalysts; such catalysts may also be described as multi-site catalysts or heterogeneous catalysts. The polymer obtained is linear in nature, as opposed to the branched nature of high pressure polyethylene. The $C_4$–$C_{10}$ alpha-olefin hydrocarbon comonomer is preferably at least one of butene-1, hexene-1 or octene-1. The linear polyethylene preferably has a density in the range of 0.9 to 0.93 g/cm$^3$, preferably 0.912 to 0.93 g/cm$^3$ and especially in the range of 0.918 to 0.925 g/cm$^3$. In addition the polymer preferably has a melt index in the range of 0.3 to 10 dg/min, preferably 0.3 to 2 dg/min and especially in the range of 0.5 to 1.5 dg/min.

The film may be used by itself to form the pouch or a part of a composite film. The composite film may be a coextruded film, a coated film or a laminated film. The film of the present invention could be laminated with the other films such as a nylon film, a polyester film, a metallized polyester film, an EVA copolymer film, or with a PVDC coating. It could also be coextruded with for example, an ethylene vinyl acetate copolymer. In all of the pouches of the present invention, the film is at least on the inside of the pouch. The end use for the pouch tends to dictate, in a large degree, the selection of the other material or materials used in combination with the film. For example nylon may be used in combination with the film of the present invention, for packaging oleagenous substances e.g. cooking oil, motor oil; polyvinylidene chloride (PVDC) or ethylene vinyl alcohol copolymers may be used in combination with the film of the present invention where a flavor or aroma barrier is desirable. It will be appreciated by those skilled in the art that a composite film having a film only on the inside of the pouch would be sufficient for pouches made with a longitudinal fin seal, whereas a composite film having films on the two outer layers of the composite film would be necessary for pouches made with a longitudinal lap seal.

When composite films in which the two outer layers are the film of the present invention, the two outer films may be made for the same or different polymers or blends. Preferably, however, they are the same polymers or blends. It is to be understood that the composite film may consist of two layers of the film of the present invention. This latter composite film is useful when one or both layers are, for example, colored with dyes or pigments e.g. a layer having carbon black, iron oxide, aluminum, bronze powder or some other dark pigment and an outer layer which contains a light pigment e.g. titanium dioxide, zinc oxide.

The blends useful in the present invention may be made by blending the constituents prior to feeding to the hopper of a film extruder, or may be made by blending the constituents at the time of extrusion just prior to remelting in the extruder, or alternatively the constituents may, be melt blended in the extruder.

The ethylene/α-olefin copolymer or blend of ethylene/α-olefin copolymer e.g. in pellet form, may be fed into a film extruder and extruded into film form using known techniques. One preferred method of manufacturing film is the so-called blown film process disclosed in Canadian Patent No. 460 963 issued Nov. 8, 1949 to E. D. Fuller. Another preferred method of manufacturing film uses an internal or external cooling mandrel in the blown film process, as disclosed for example in Canadian Patent No. 893 216 issued Feb. 15, 1972 to M. Bunga and D. V. Thomas.

The film, after manufacture, is slit longitudinally into appropriate widths. Where a vertical form, fill and seal apparatus is used, the width is selected on the basis of the diameter of the tube to be formed.

It will be understood by those skilled in the art that additives e.g. UV stabilizers, anti-block agents, slip additives, may be added to the polymers from which the pouches of the present invention are made.

The pouches of the present invention may be used in the packaging of flowable materials e.g. liquids, as defined above. In particular, the pouches may be used in the packaging of milk. The pouches may be made using any liquid pouch-forming apparatus, including vertical form, fill and seal machines such as the Prepac® IS-6 or IS-7.

The films of the present invention may be used to make pouches of improved integrity as compared to prior art pouches, thereby substantially reducing the leaker rate of the pouches. The leaker rate may be measured using a drop test. In a drop test, pouches of the same dimensions containing the same type and amount of liquid are made using the same type of pouch-forming equipment and are all dropped from the same height and position. The number of leakers expressed as a percentage of the total number of pouches dropped is used as the basis of comparison between pouches made from different films. The particular drop test used in the Examples herein is referred to as the $M_{11}$-test. The $M_{11}$-test is carried out as follows: In general terms, the $M_{11}$-test is a drop test carried out on 1.3 liter water-filled pouches. In the test, pouches containing 1.3 liters of water, at a temperature of 10±5° C., are made from a 32 cm. wide film web, on a Prepac IS-6 vertical form, fill and seal machine. The water-filled pouches containing cold water, are dropped onto a concrete floor from a height of 335 cm. The pouches are positioned with the longitudinal axis of the tube i.e. pouch, parallel to an imaginary vertical line.

Any pouch from which water flows or weeps after the pouch has been dropped onto the floor, is termed a "leaker". The number of leakers, expressed as a percentage of the total number of pouches dropped is the $M_{11}$-test value for the particular film being tested. It will be noted that the $M_{11}$-test value will be affected by the thickness of the film as well as the material from which the film is made.

The process for forming the pouch with the Prepac IS-6 machine for the purpose of carrying out the $M_{11}$-test in the Examples is as follows. The web of film is formed into a continuous tube with a lap seal, said tube having an inside diameter of approximately 9.8 cm. A typical vertical sealing jaw of the Prepac IS-6 apparatus has an approximately 3.5 by 0.3 mm rectangular sealing were made of Nichrome® alloy, and a transverse sealing jaw with an approximately 1.8 by 0.7 mm sealing wire made of Nichrome® alloy. The operation of the vertical and transverse sealing element should be optimized for the particular film type and thickness used. Typically, during vertical sealing of the tube, a 35–50 amp current at 14–24 volts is passed through the sealing wire for about 0.2–0.5 seconds. The force applied by the vertical sealing jaws to the film is about 8 Newtons applied for a dwell time of about 0.9 seconds as measured by. The vertical sealing jaw is cooled by water at 13°±6° C. During transverse sealing of the tube, a 35–55 amp current at 10–15 volts is passed through the sealing wire for about 0.2–0.5 seconds. The force applied by the transverse sealing jaws to the film is about 19 N as measured by applied for a dwell time of about 0.9 seconds. The transverse sealing jaw is cooled by water at 13°±6° C. Both sealing jaws are covered with 150 µm thick glass fiber tape impregnated with Teflon® polytetrafluoroethylene resin. With respect to optimizing the sealing operations, it will be recognized that the sealing conditions (e.g. amperage, voltage, dwell time) depend on the thickness and melting characteristics of the film. For example, a 50 µm film would require lower amperage and voltage, as controlled by the rheostat on the apparatus, than would a 75 µm film. Typically such a change in film thickness requires an adjustment of approximately 10% of the rheostat range.

It is the film of the present invention that is selected upon the basis of a drop test such as the $M_{11}$-test, not the composite film, where the film is coextruded or laminated with other film, and not the pouch.

The present invention is illustrated by the following examples.

EXAMPLE I

The following monolayer films were manufactured using a conventional blown film process and slit to a width of 324 mm, Film A being a comparative film:

A 85% of a (multi-site catalyst) linear low density ethylene/octene-1 copolymer, with a density of 0.920 g/cm³ and a melt index of 0.75 dg/min; 15% of a high pressure low density polyethylene, having a density of 0.921 g/cm³, and a melt index of 5.0 dg/min;

B 85% of a linear low density ethylene/butene-1 copolymer, manufactured with a single-site catalyst, having a density of 0.900 g/cm³ and a melt index of 1.2 dg/min commercially available from Exxon, sold under the trade name Exxon Exact 3028; 15% of the low density polyethylene of A;

C 45% of the linear ethylene/octene-1 copolymer of A; 40% of a linear low density ethylene/butene-1 copolymer manufactured with a single-site catalyst commercially available from Exxon, sold under the trade name Exxon Exact 4011, having a density of 0.887 g/cm³, a melt index of 2.2 dg/min and a stress exponent of 1.08; and 15% of the low density polyethylene of A. Each of the films had a thickness of 3 mil.

Each of the films were fed to a Prepac IS-6 vertical form, fill and seal pouch forming apparatus. Pouches having a vertical lap seal and two horizontal end seals were made, each being about 28 cm in length and containing 1.3 L of water. The pouches obtained were dropped end-wise from a height of 335.3 cm onto a concrete floor in accordance with the $M_{11}$-test. After dropping, each pouch was examined for leakers.

The results obtained were as follows:

| FILM | NO. DROPPED | NO. LEAKERS | LEAKER % |
|------|-------------|-------------|----------|
| A | 177 | 36 | 20.3% |
| B | 204 | 29 | 14.2% |
| C | 204 | 36 | 17.6% |

This example shows that the pouches formed from the polyethylene manufactured using a single-site catalyst (Films B and C) performed significantly better than the multi site catalyst ethylene/octene-1 copolymer (film A).

EXAMPLE II

The procedure of Example I was repeated using the following films which were made using an internal cooling mandrel in the blown film process; Film D being a comparative film:

D 85% of a multi-site catalyst linear low density ethylene/octene-1 copolymer, with a density of 0.320 g/cm³, a melt index of 0.75 dg/min and a stress exponent of 1.31; 15% of a high pressure low density polyethylene, having a density of 0.921 g/cm$^3$;

E 45% of a linear low density ethylene/octene-1 copolymer manufactured using a multi-site catalyst, as described in D; 40% of a single-site catalyst linear ethylene/butene-1 copolymer having a density of 0.887 g/cm$^3$ a melt index of 2.2 dg/min commercially available from Exxon sold under the trade name Exxon Exact 4011; 15% of the low density polyethylene of D;

F 65% of the linear low density ethylene/octene-1 copolymer of D; 20% of the single-site catalyst linear ethylene/butene-1 copolymer of E and 15% of the low density multi-site polyethylene of D.

The pouches were manufactured and dropped using the procedure of Example I. The results obtained where as follows:

| FILM | NO. DROPPED | NO. LEAKERS | LEAKER % |
|---|---|---|---|
| D | 204 | 39 | 19.1% |
| E | 203 | 29 | 14.3% |
| F | 204 | 32 | 15.7% |

The results again showed the superior performance of the pouches of the present invention.

EXAMPLE III

The procedure of Example I was repeated using the following films, Film G being a comparative film:

G 85% of a multi-site catalyst linear low density ethylene/octene-1 copolymer, with a density of 0.920 g/cm$^3$, a melt index of 0.75 dg/min and a stress exponent of 1.31; 15% of a high pressure low density polyethylene, having a density of 0.921 g/cm$^3$ and a melt index of 5.0 dg/min;

H 85% of a single-site catalyst-produced ethylene/hexene-1/butene-1 terpolymer commercially available from Exxon sold under the trade name Exxon Exact 3006 having a density of 0.910 g/cm$^3$, a melt index of 1.7 dg/min and a stress exponent of 1.07; 15% of a low density polyethylene of G;

I 45% of a multi-site catalyst linear low density ethylene/octene-1 copolymer; 40% of a single-site catalyst ethylene/butene-1 copolymer commercially available from Exxon, sold under the trade name Exxon Exact 4011 having density of 0.87 g/cm$^3$, a melt index of 2.2 dg/min; 15% of a low density polyethylene of G.

The pouches were manufactured and tested using the procedure of Example I. The results obtained were as follows:

| FILM | NO. DROPPED | NO. LEAKERS | LEAKER % |
|---|---|---|---|
| G | 204 | 82 | 40.2% |
| H | 204 | 57 | 27.9% |
| I | 204 | 51 | 25.0% |

The films of the invention showed significantly superior performance.

EXAMPLE IV

The procedure of Example I was repeated using the following films; Film L being a comparative film:

L 85% of multi-site catalyst octene copolymer LLDPE, density 0.920 g/cm$^3$, melt index 0.75 g/10 min; 15% of a high pressure polyethylene, density 0.921 g/cm$^3$, melt index 5.0 g/10 min.

M 94% of a single-site catalyst octene copolymer LLDP, density 0.915 g/cm$^3$, melt index 1.02 g/$^{10}$ min, commercially available from Dow under the trade name Dow Affinity FM 1570, 6% additive concentrates.

N 94% single-site catalyst octene copolymer LLDPE, density 0.908 g/cm$^3$, melt index 1.08 g/10 min, stress exponent 1.51 commercially available from Dow under the trade name Dow Affinity PL 1840, 6% additive concentrates.

| FILM | NO. DROPPED | NO. LEAKERS | LEAKER % |
|---|---|---|---|
| L | 204 | 67 | 32.8 |
| M | 203 | 34 | 16.7 |
| N | 204 | 46 | 22.5 |

EXAMPLE V

The following films were made using an internal cooling mandrel in the blown film process (otherwise the process of Example I was as followed).

O 85% of a multi-site catalyst octene copolymer LLDPE, density 0.920 g/cm$^3$, melt index 0.75 g/10 min; 15% of a high pressure polyethylene, density 0.921 g/cm$^3$, melt index 5.0 g/10 min.

P 30% of a single-site catalyst octene copolymer LLDPE, density 0.915 g/cm$^3$, melt index 1.02 g/10 min, commercially available from Dow under the trade name Dow Affinity FM 1570; 58% of a multi-site catalyst octene copolymer LLDPE, density 0.920 g/cm$^3$, melt index 0.75 g/10 min; 10% of a high pressure polyethylene, density 0.921 g/cm$^3$, melt index 5.0 g/10 min; and 2% of additive concentrates.

Q 94% of a single-site catalyst octene copolymer LlDPE, density 0.915 g/cm$^3$, melt index 1.02 g/10 min, commercially available from Dow under the trade name Dow Affinity FM 1570; and 6 of additive concentrates.

| FILM | NO. DROPPED | NO. LEAKERS | LEAKER % |
|---|---|---|---|
| O | 204 | 80 | 39.2 |
| P | 204 | 67 | 32.8 |
| Q | 204 | 51 | 25.0 |

EXAMPLE VI

The following films were made using the process of Example V and the procedure of Example I was followed:

R 85% of a multi-site catalyst octene copolymer LLDPE, density 0.920 g/cm$^3$, melt index 0.75 g/10 min; and 15% of a high pressure polyethylene, density 0.921 g/cm$^3$, melt index 5.0 g/10 min.

S 94% single-site catalyst octene copolymer LLDPE, density 0.903 g/cm$^3$, melt index 1.22 g/10 min, commercially available from Dow and sold under the trade name Dow Affinity PL 1880; and 6% of additive concentrates T 94% of a single-site catalyst octene copolymer LLDPE, density 0.908 g/cm$^3$, melt index 1.08 g/10 min, commercially available from Dow and sold under the trade name Dow Affinity PL 1840; and 6% of additive concentrates.

| FILM | NO. DROPPED | NO. LEAKERS | LEAKER % |
|------|-------------|-------------|----------|
| R | 203 | 85 | 41.9 |
| S | 215 | 52 | 24.2 |
| T | 202 | 55 | 27.2 |

The results show the improvement obtained using single site octene copolymer LLDPE over multi-site octene copolymer LLDPE.

EXAMPLE VII

The films made in Examples I–VI were measured to determine their density and melt index. The results are tabulated below:

| Example | Film | Density (g/cubic centimeter) | Melt Index (g/10 min) |
|---------|------|------------------------------|------------------------|
| I | A | 0.919 | 0.7 |
|   | B | 0.907 | 1.3 |
|   | C | 0.908 | 1.3 |
| II | D | 0.918 | 0.7 |
|    | E | 0.909 | 1.3 |
|    | F | 0.914 | 0.9 |
| III | G | 0.923 | 0.7 |
|     | H | 0.916 | 1.4 |
|     | I | 0.911 | 1.3 |
| IV | L | 0.921 | 0.9 |
|    | M | 0.916 | 1.1 |
|    | N | 0.911 | 1.2 |
| V | O | 0.918 | 0.7 |
|   | P | 0.917 | 0.8 |
|   | Q | 0.913 | 1.1 |
| VI | R | 0.918 | 0.7 |
|    | S | 0.905 | 1.3 |
|    | T | 0.910 | 1.1 |

What is claimed is:

1. A process for making pouches filled with a flowable material, using a vertical form, fill and seal apparatus, in which process each pouch is made from a flat web of film by forming a tubular film therefrom with a longitudinal seal and subsequently flattening the tubular film at a first position and transversely heat sealing said tubular film at the flattened position, continuously filling the tubular film with flowable material above said first position, flattening the tubular film above a predetermined quantity of flowable material at a second position and transversely heat sealing said tubular film at the second position, the improvement comprising making the pouch from a film formed from a blend comprising a linear polymer of ethylene with at least one $C_4$–$C_{10}$ alpha-olefin manufactured in a single-site catalyst polymerization process, and at least one of the following
    a) a linear polymer of ethylene with at least one $C_4$–$C_{10}$ alpha-olefin made by a multi-site catalyst polymerization process;
    b) a high pressure low density polyethylene, and
    c) additives; selected from the group consisting of: stabilizers, antiblock additives, and extrusion aids and the vertical form, fill and seal apparatus includes impulse sealing means for making transverse seals in the film through the flowable material.

2. The process as claimed in claim 1 wherein the linear polymer of ethylene and at least one $C_4$–$C_{10}$ alpha-olefin manufactured in a single-site catalyst polymerization process is selected from the group consisting of ethylene/butene-1, ethylene/hexene-1, ethylene/octene-1 and ethylene/hexene-1/butene-1 polymers.

3. The process as claimed in claim 2 wherein the linear polymer of ethylene and at least one $C_4$–$C_{10}$ alpha-olefin manufactured in a single-site polymerization process contains no long chain branching and is an ethylene/hexene-1 polymer.

4. The process as claimed in claim 1 wherein the blend comprises:
    a) from 10 to 85% by weight of a linear polymer of ethylene and at least one $C_4$–$C_{10}$ alpha-olefin containing no long chain branching and manufactured in a single-site catalyst polymerization process, said polymer having a density in the range of from 0.8 to 0.93 g/cm$^3$ and a melt index of less than 5 dg./min.;
    b) from 0 to 75% by weight of a linear polymer of ethylene and at least one $C_4$–$C_{10}$ alpha-olefin manufactured by a multi-site catalyst polymerization process, said polymer having a density in the range of from 0.9 to 0.93 g/cm$^3$ and a melt index of from 0.2 to 2 dg./min.; and
    c) 15% by weight of a high pressure low density polyethylene having a density of from 0.9 to 0.93 g/cm$^3$ and a melt index of from 1 to 10 dg./min.

5. The process as claimed in claim 1 wherein the linear polymer comprises a long chain branched linear polymer of ethylene and at least one $C_4$–$C_{10}$ alpha-olefin manufactured in a single-site catalyst polymerization process.

6. The process as claimed in claim 1 wherein the long chain branched linear polymer has a density in the range of 0.9 to 0.93 g/cm$^3$ and a melt index in the range of 0.3 to 10 dg/min., and the high pressure low density polyethylene has a density in the range of 0.916 to 0.93 g/cm$^3$ and a melt index in the range of 1 to 10 dg/min.

7. The process as claimed in claim 1 wherein the film has a density in the range of from 0.86 to 0.94 g/cm$^3$ and a melt index of from 0.2 to 10 dg/min.

8. The process as claimed in claim 5 wherein the blend comprises 94% by weight of a single-site catalyst produced long chain branched linear polymer of ethylene-octene having a density 0.915 cm/cm$^3$ and melt index 1.02 g/10 min. and 6% by weight of additives.

9. The process as claimed in claim 5 wherein the blend comprises 30% by weight of a single-site catalyst produced long chain branched linear polymer of ethylene-octene of density 0.915 g/cm$^3$ and melt index 1.02 g/10 min.; 58% by weight of a linear copolymer of ethylene-octene produces by a multi-site catalyst process of density 0.920 g/cm$^3$ and melt index 0.75 g/10 min.; 10% by weight of a high pressure polyethylene of density 0.921 g/cm$^3$ and melt index 5.0 g/10 min.; and 2% by weight of additives.

10. The process as claimed in claim 1, wherein the blend comprises 94% by weight of a single-site catalyst produced long chain branched linear polymer of ethylene-octene having a density 0.908 g/cm$^3$ and melt index 1.08 g/10 min. and 6% by weight of additives.

11. The process as claimed in claim 1, wherein the blend comprises 94% by weight of a single-site catalyst produced long chain branched linear polymer of ethylene-octene having a density 0.903 g/$^3$ and melt index 1.22 g/10 min. and 6% by weight of additives.

12. The process of claim 1 wherein the film comprises a layer containing dyes or pigments.

* * * * *